United States Patent
Yamashita et al.

(10) Patent No.: US 11,465,849 B2
(45) Date of Patent: Oct. 11, 2022

(54) METHOD OF ORDER FULFILLING BY MAKING STORAGE UNITS AVAILABLE FROM A STORAGE FACILITY IN A DESIRED SEQUENCE AT A PACK STATION

(71) Applicants: Dematic GmbH, Heusenstamm (DE); DEMATIC Pty. Ltd., Sydney (AU)

(72) Inventors: Shin Yamashita, Oberursel (DE); Yoshio Inoue, Tokyo (JP)

(73) Assignees: Dematic GmbH, Heusenstamm (DE); DEMATIC Pty, Ltd., Sydney (AU)

( * ) Notice: Subject to any disclaimer, the term of this patent is extended or adjusted under 35 U.S.C. 154(b) by 100 days.

(21) Appl. No.: 16/955,662

(22) PCT Filed: Dec. 22, 2017

(86) PCT No.: PCT/EP2017/084530
§ 371 (c)(1),
(2) Date: Jun. 18, 2020

(87) PCT Pub. No.: WO2019/120584
PCT Pub. Date: Jun. 27, 2019

(65) Prior Publication Data
US 2020/0385211 A1 Dec. 10, 2020

(51) Int. Cl.
*B65G 1/137* (2006.01)
*B65G 1/06* (2006.01)
*G06Q 10/08* (2012.01)

(52) U.S. Cl.
CPC ............ *B65G 1/1378* (2013.01); *B65G 1/06* (2013.01); *G06Q 10/087* (2013.01);
(Continued)

(58) Field of Classification Search
CPC ...... B65G 1/1378; B65G 1/06; B65G 1/1376; B65G 2201/0258; B65G 2209/10; G06Q 10/087
See application file for complete search history.

(56) References Cited

U.S. PATENT DOCUMENTS 6,687,568 B2  2/2004  Ohtsuka et al.
9,452,886 B2  9/2016  Yamashita
(Continued)

FOREIGN PATENT DOCUMENTS

CN  105392719 A  3/2016
CN  107215600 A  9/2017
(Continued)

OTHER PUBLICATIONS

International Search Report of the International Searching Authority from corresponding Patent Cooperation Treaty PCT) Application No. PCT/EP2017/084530, indicated completed on Sep. 6, 2018.
(Continued)

*Primary Examiner* — Kyle O Logan
(74) *Attorney, Agent, or Firm* — Gardner, Linn, Burkhart & Ondersma LLP (57) ABSTRACT

A method of fulfilling orders by making orders available in order units by picking from product units in a storage facility that includes a routed product order picking area, and an automated storage and retrieval racking area that is upstream from the routed products order picking area and connected thereto by a routing conveyor. The method includes reassigning order fulfillment of orders requiring products from product units requiring many exchanges between adjoining storage racks from a source storage rack to an adjacent storage rack via cross conveyance locations in the storage racks themselves to reach a destination storage rack, where the orders are reassigned to the routed products order picking area for parallel order fulfillment such that bottlenecks within the automated storage and retrieval racking area can be prevented or at least decreased.

21 Claims, 3 Drawing Sheets

(52) U.S. Cl.
    CPC .... *B65G 1/1376* (2013.01); *B65G 2201/0258* (2013.01); *B65G 2209/10* (2013.01)

(56) References Cited

U.S. PATENT DOCUMENTS

| | | |
|---|---|---|
| 10,537,990 B2 | 1/2020 | Heath et al. |
| 10,669,097 B2 | 6/2020 | Post et al. |
| 2003/0093176 A1 | 5/2003 | Ohtsuka et al. |
| 2011/0295413 A1 | 12/2011 | Hara et al. |
| 2016/0229633 A1* | 8/2016 | Yamashita ........... B65G 1/1378 |

FOREIGN PATENT DOCUMENTS

| | | |
|---|---|---|
| EP | 2170742 B2 | 10/2012 |
| EP | 2862818 A1 | 4/2015 |
| EP | 3057888 A1 | 8/2016 |
| JP | 2009518258 A | 5/2009 |
| JP | 2015096438 A | 5/2015 |
| JP | 2016526519 A | 9/2016 |
| WO | 2015007513 A1 | 1/2015 |

OTHER PUBLICATIONS

Written Opinion of the International Searching Authority from corresponding Patent Cooperation Treaty (PCT) Application No. PCT/EP2017/084530, indicated completed on Sep. 6, 2018.
International Preliminary Examination Report from corresponding Patent Cooperation Treaty (PCT) Application No. PCT/EP2017/084530 dated Mar. 12, 2020.

* cited by examiner

METHOD OF ORDER FULFILLING BY MAKING STORAGE UNITS AVAILABLE FROM A STORAGE FACILITY IN A DESIRED SEQUENCE AT A PACK STATION

CROSS REFERENCE TO RELATED APPLICATION

The present application claims the priority benefits of International Patent Application No. PCT/EP2017/084530, filed Dec. 22, 2017, which is incorporated herein by reference in its entirety.

BACKGROUND AND FIELD OF THE INVENTION

The invention relates to a method of order fulfilling in a storage facility.

When operating storage facilities for order fulfillment several aspects must be taken into account as described below.

While picking or compiling orders from transporting units, such as e.g. articles or containers, it is necessary to provide the transporting or storage units, which are associated with a common order, in a directed or sorted fashion. In addition, it is conventional to intermediately store (buffer) the transporting units of an order, until all of the transporting units required for the order are present. They are then passed together onto a collecting line which leads them e.g. to the palletization area, pack station, goods issue, shipment etc.

In the pack station the goods for fulfilling an order are taken from the storage units and placed according to the order into an order container etc. The storage container (often called donor) is then routed back into the racking storage and stored until needed for the next order.

Order fulfillment of orders placed over the Internet must take place within a relatively short period of time in order to be commercially competitive. Such order fulfillment is known as E-commerce and places demands on an order fulfillment system to meet such obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a barcode or radio frequency identification (RFID) tag that identifies the SKU of the item.

Because of the large number of SKU's from which an order may be selected, the inventory warehouse may be very large in footprint. As such, it is common to designate geographic portions of the inventory warehouse to each be picked by an individual picker such that each picker picks only a portion of each order, since each order may be spread out over the entire general footprint of the inventory warehouse. Each picker is directed by a warehouse management system to pick portions of a number of orders using a various picking technology known in the art. It is efficient to have the picker mix several orders in one picking or picked receptacle rather than having multiple receptacles, each bearing one order portion in this way, each order may be contained in a number of picked receptacles if the order contains more than an individual item. However, it is then necessary to subsequently sort the contents of the picked receptacle(s) to the order and to process the items so that they can be packed-out for shipment via courier. Also, orders may be made up of items having various physical characteristics such that some items are not able to be readily handled by a conventional material-handling system. Such items are known as non-conveyable.

EP 2 170 742 B2 discloses a method in which at a singulation station of a materials handling facility, individual units of items from collections of items are selected, wherein the collection of items includes units of heterogeneous items picked from inventory storage of the materials handling facility to fulfill a plurality of orders; associating an item identifier of a particular item of the individual units of items with a receptacle identifier of a particular conveyance receptacle of a plurality of conveyance receptacles; associating the particular conveyance receptacle with a particular order that specifies at least one unit of the particular item.

In other words, articles from a mixed or dirty batch picking process are singulated by putting a single separate article into/onto a conveyance receptacle and marrying these by correlating their identifiers in a database. From then on only the receptacle identifier is tracked throughout the facility.

US 2011/0295413 A1 discloses a similar method, in which each item from a mixed batch pick is singulated at an induction station into a receptacle on its own.

Further it is difficult to manage fluctuations in demand within storage facilities. Manually run storage facilities with manual pack stations are usually capable of managing the fluctuation and have low initial costs and can be very effective for very slow-moving articles in general and fast moving particularly across limited articles and low-cost labor situations. However, they must be larger in space to handle the same amount of orders as automated high bay systems. In addition, it is difficult to control the progress of manual operations in the timely fashion and running cost and even availability of labor may become an issue in high cost labor situations.

WO 2015/007513 A1 describes a method of fulfilling orders by making orders available in order units by picking from product units in a storage facility. The storage facility has a manual storage and picking area and an automated storage and retrieval racking area. The automated storage and retrieval racking area is arranged downstream or upstream from the manual picking area and is connected to the manual picking area by a routing conveyor, which leads to a shipping area. The manual storage and picking area comprises manual picking stations supplied and arranged along the extension of the routing conveyor and supplying the routing conveyor with order units picked at the manual picking stations. The automated storage and retrieval racking area comprises a storage racking comprising a plurality of multilevel storage racks in which order and/or product units are stored, wherein the storage racks are disposed back-to-back in pairs and have an aisle between pairs. At least one storage-entry conveyor is provided for feeding order and/or product units into the storage racking and at least one storage-exit conveyor is provided for retrieval of order and/or product units from the storage racking. Further at least one automatic storage and retrieval device is provided for each storage racking aisle, wherein the order and/or product units are stored and retrieved from the storage racks by the automatic storage and retrieval and at least one lifting device is used, in order to transfer the order and/or product units to the at least one storage-exit conveyor. Also at least one fully or semiautomatic picking station for picking from product units into order units for fulfilling orders is used, to which order and/or product units are fed by the at least one storage-exit conveyor and from which order and/or product units are dispatched by the at least one storage-entry conveyor.

Order and/or product units are exchanged directly between two adjoining storage racks from a source storage rack to an adjacent destination storage rack via cross conveyance locations in the storage racks themselves and the routing conveyor is connected to the at least one inbound storage-entry conveyor and/or the at least one storage-exit conveyor of the storage racking, such that order units containing completed orders coming from the manual storage and picking area are dispatched via the routing conveyor to the shipping area or introduced into the storage racking of the automated storage and retrieval racking area via the at least one storage-entry conveyor for later dispatch; or order units containing completed orders coming from the storage racking of the automated storage and retrieval racking area are dispatched via the routing conveyor to the shipping area; or order units containing completed orders coming from the fully or semiautomatic picking station of the automated storage and retrieval racking area are dispatched via the routing conveyor to the shipping area or introduced into the storage racking of the automated storage and retrieval racking area via the at least one storage-entry conveyor for later dispatch; or order units containing partial orders coming from the manual storage and picking area are introduced into the storage racking of the automated storage and retrieval racking area via the at least one storage-entry conveyor for further processing or introduced directly into the fully or semiautomatic picking station for immediate processing; or order units containing partial orders coming from the fully or semiautomatic picking station or the storage racking of the automated storage and retrieval racking area are introduced into the storage racking of the automated storage and retrieval racking area or to the manual storage and picking area for further processing.

This allows applications with high fluctuation rates of demand/order fulfillment or existence of very slow movers or limited number of very fast movers to be served. The manual picking area can be used not only to pick very slow movers and very fast movers in the economical and also efficient fashion, but also to cope with peak periods in demand and can, on the other hand, be switched off when not needed. This allows to keep the automated storage and retrieval racking area in an optimal utilization range. Also, the manual picking area relieves the automated storage and retrieval racking area of some of the storage volume need.

However, the use of the direct exchange of units within the racking between back-to-back racks may create a bottleneck for through put. Orders need to be consolidated in the most appropriate aisle. To do so an excessive amount of direct exchange may block use of storage racking machine (SRM=Storage and Retrieval Machine, or Automated Storage and Retrieval System, ASRS, shuttle, mini load etc.) due to e.g. large number of aisles, distribution of donor units within the racking multiplicity, large numbers of orders including many different products, not enough rack levels etc. In addition, the problem may be amplified if pick operator performance is low and lift performance is high when lifts are directly connected to picking stations.

SUMMARY OF THE INVENTION

The present invention provides a method of order fulfilling, which allows use of order fulfillment with direct exchange of units within the racking between back-to-back racks, without bottleneck or lowered bottleneck.

In accordance with the invention, it has been recognized that if order fulfillment of orders requiring products from product units requiring many exchanges between adjoining storage racks from a source storage rack to an adjacent storage rack via cross conveyance locations in the storage racks themselves (so-called inter Aisle Transfer, iAT) to reach a destination storage rack are reassigned to the routed products order picking area for parallel order fulfillment, bottlenecks in the iAT within the automated storage and retrieval racking area can be prevented or at least decreased.

According to an aspect of the invention such product units requiring many exchanges via cross conveyance locations for fulfilment of a specific order are discharged from the automated storage and retrieval racking area to the routed products order picking area.

In other words, orders requiring many items stored in many different aisles of the storage racking are reassigned to the routed products area to be fulfilled there.

This may also include orders requiring items with many needed exchanges via cross conveyance locations are reassigned to the routed products area.

The above criteria may for example be met, with orders requiring average more than 4 exchanges per donor or order consisting of donor requiring more than 8 exchanges.

The above criteria may for example be also met, when the number of aisles and/or needed exchanges via cross conveyance locations exceed 4 different aisles or items needing at least 4 exchanges or at least 4 items needing more than 2 exchanges.

In addition, orders that can expect high batch pick effects might be routed to the routed product order picking area. For instance, if there are numbers of orders all requiring product A and B, those products are routed to the routed order pick area and picked for those multiple orders so that the number of necessary retrieval and aisle exchanges of products can be reduced.

According to a further aspect of the invention the routed products picking area comprises picking stations supplied by and arranged along the extension of the routing conveyor and supplying the routing conveyor with order units picked at the routed products picking stations. In this way the Orders may be reassigned to the routed products order picking area when the efficiency of the at least one automatic storage and retrieval device falls below a predetermined threshold.

Such a predetermined efficiency threshold may be based upon the feed rate of items to the at least one fully or semiautomatic picking station.

It has been found that when more than certain number of picking stations (or aisle when these are directly connected) are present, the throughput decreases when all those picking stations are in use due to the amount of cross conveyance operations necessary to provide the needed items to each picking station.

Such a predetermined feed rate may be 600-700 cases/items per hour per picking station.

For example, if an order to be fulfilled includes more than three different products, which are each stored in the automated storage and retrieval racking area such that they would need at least three iATs to reach the destination aisle best for discharge to an automated picking station, the system controller could find that it is necessary to reassign the corresponding order to the manual picking area so as to be able to achieve wanted throughput at all picking stations, i.e. within the whole system.

In other words, in this way, the amount of iAT transactions is reduced. Therefore, SRMs (e.g. shuttle) can perform more storage and retrieval cycles and also the delay of order consolidations from releasing orders from aisles is reduced. Both increase SRM retrieval performance enabling to deal with an overloaded situation.

At the same time, the lift (which has very high throughput capacity) can be fully utilized independent of picking rates at the automated picking stations as it also supplies the manual picking area.

In this way, the overall system rate can be increased with minimum extra investment although it needs extra operators for put walls, where productivity of operators is not as efficient as the at the automated picking stations.

This fits very well for applications with short peak order duration and long base periods such as e-commerce order fulfillment.

In turn this allows for larger number of aisles in the automated storage area.

It is preferred that product units requiring many exchanges are discharged from the automated storage and retrieval racking area to the routed products order picking area, so as to allow fulfillment of the reassigned orders. In other words, all product units are sourced from the automated storage.

Alternatively, some product units may be deployed to the routed products order picking area by other routes.

The routed products order picking area comprises manual picking stations supplied and arranged along the extension of the routing conveyor and supplying the routing conveyor with order units picked at the manual picking stations. As such the routing conveyor has dual functions, namely to supply donor units to the routed products order picking area and to discharge finished order units (to packing and shipping area).

Preferably the manual picking stations comprise putwalls. A put wall is a light-directed sorting station that can be used in receiving, packing, and shipping operations to direct operators in placing inventory items into slots or containers associated with specific orders, warehouse zones, or store locations. A put wall can consist of a simple wall of mail slot type openings or complete racking systems in which cartons, totes, or even Gaylord containers are used as the sort destination. A put-wall system is a scalable and modular solution that optimizes order fulfilment for piece picking. The solution serves as an order consolidation and packing method that brings high productivity, order accuracy, speed and efficiency to the order fulfilment process. The put-wall system is a "divide and conquer" strategy. The process combines order lines from multiple orders and creates high density, efficient picking throughout the warehouse.

It is used to consolidate and pack the items for each individual order. Essentially it is a goods-to-person workstation, directed by software. A typical put-wall has multiple workstations and often uses conveyor to deliver containers of preselected SKUs, usually plastic totes, into the put-wall module. The workstation may be made up of a "wall" of shelving with individual compartments or "cubbies" that hold one customer order each. A put-wall can support any number of separate order compartments with 30-75 typical. The compartments can be configured in multiple sizes to support multiple order volumes. The front or induct side is dedicated to "putting" items into the compartments as they are removed one at a time from the pre-picked totes. Each compartment corresponds to a specific order. The back side is dedicated to packing orders.

Alternatively or additionally, the manual picking stations, i.e. put-wall(s) may be automatically sourced by a SRMs (e.g. shuttle).

The routed products order picking area may comprise manual picking stations supplied and arranged along an outer aisle of the automated storage and retrieval racking area and supplying the routing conveyor with order units picked at the manual picking stations.

The routing conveyor may loop back to the automated storage and retrieval racking area after leaving the routed products order picking area, allowing for reintroduction of donor/product units into the automated storage and retrieval racking area. This also makes it possible to use the aisles of the automated storage both as sources for product units and also as destination aisles for consolidation of donor for orders.

The storage facility may be an automated storage facility, meaning that it may be partially or fully automated.

The term "receptacles" includes totes, trays, containers, paperboard containers, carton boxes etc. If not denoted otherwise receptacles may be of the

- donor type containing inventory stored and not allocated to any order, in other words items are picked from these receptacles;

or

- order type containing picked items, i.e. containing completed orders or orders in progress.

The automated storage and retrieval racking area comprises a storage racking comprising a plurality of multilevel storage racks in which order and/or product units are stored, wherein the storage racks are disposed back-to-back in pairs and have an aisle between pairs. In other words, the racks have an aisle between them and each rack abuts a rack of a neighboring aisle.

All donor, batch receptacle and order receptacles are fed into the storage racking by at least one storage-entry conveyor and retrieved by at least one storage-exit conveyor. Preferably one storage-entry conveyor and one storage-exit conveyor are provided for each aisle.

Each storage racking aisle is serviced by at least one automatic storage and retrieval device (ASRS) for storage and retrieval of receptacles from the storage. Preferably each level of each aisle has a dedicated ASRS machine but also ASRS devices serving two and more levels are possible.

Receptacles are exchanged directly between two adjoining storage racks from a source storage rack to an adjacent destination storage rack via cross conveyance locations in the storage racks themselves. This allows sorted retrieval from storage in a simpler manner and without sortation outside of the aisles. This reduces technical complexity and space, lowers cost and achieves better reliability.

In accordance with the invention, it has been also recognized that when receptacles are exchanged directly between two adjoining storage racking units from one rack of a storage racking aisle to an adjacent rack of a next storage racking aisle via cross conveyance locations in the storage racking units, distribution and/or complex sorting in the front-zone can be omitted, since the receptacles are already stored in a single storage rack aisle even if initially they were stored elsewhere. When retrieved from storage, they are simply retrieved in sequence. Therefore, a direct transfer of receptacles without distribution or sorting outside of the aisles can be achieved without "crossing" conveyors and this with a simpler and smaller technical installation with smaller space and higher reliability. The receptacles can therefore just be retrieved from the respective aisle in the required sequence. This allows for reduction of the so-called front-zone installations. The storage is preferably a fully automated storage.

In other words, storage racking locations of abutting racks are used for passing receptacles from one side of the racking through to the next, so that the transporting units can be transferred from one racking to the next.

So, the automated storage facility comprises a three-dimensional warehouse for storage of receptacles with shuttles servicing each aisle and possibly each level, wherein the shuttles themselves have load handling means which allow transfer of receptacles directly between adjoining racks by pushing or pulling the receptacles from a source rack location of a first rack to a destination rack location of an adjoining second rack, and optionally each aisle is connected to a pack station.

Therefore, cross conveyance or sorting is possible inside the racking units themselves and accordingly it is possible to dispense with "cross conveyance" in the front-zone completely.

If necessary, the use of a front zone conveyor for cross conveyance can be combined with this concept especially if the front zone conveyor cannot be omitted for other reasons than cross conveyance, while reducing the complexity and throughput requirements of the front zone conveyor and control system.

In an expedient manner, the cross-conveyance locations are provided in each level or any selected level of the storage racking units.

Particularly effective path-time optimization is achieved if the cross-conveyance locations are disposed closer to inbound and outbound conveyor line. It is also possible to locate cross conveyance locations at different positions within a level.

The cross-conveyance locations can also be used as buffers, especially if they belong to final destination aisle of the receptacles, i.e. the transporting or storage units remain therein, until they are actually needed or retrieved.

Preferably the automatic storage and retrieval device (ASRS, SRM) itself displaces the receptacles in the cross-conveyance locations, i.e. it is most preferred that the ASRS itself is the active handling means, i.e. the receptacles are handled only by the ASRS also for exchange in the cross-conveyance locations and these do not have any kind of own drive means.

For exchange purposes, the ASRS can likewise place receptacles in double-depth storage or multiple-depth storage in the cross-conveyance location. The ASRS of one aisle can thus place the receptacles in storage in the cross-conveyance locations to such a depth that they are already to be assigned to the adjacent racking and can be reached "normally" by the ASRS, in other words the automatic storage and retrieval device of a source rack places the receptacles into the cross-conveyance location in an adjacent destination rack. In addition, the load receiving means, e.g. telescopic arms, can have an extended range. It is also possible to use a stacked storage of receptacles.

It is particularly preferable if the ASRS are "miniloads" or single-level racking serving units. In particular shuttles or satellite vehicles are preferred. A "miniload" ASRS is a floor run multilevel storage and retrieval machine with a flexible load handling device that supports a wide range of individual articles, bundled or stacked articles, containers, trays, cartons of different sizes and weights.

According to the invention automatic storage and retrieval device for use in the invention are so-called shuttles or single level rack servicing machines traveling horizontally in a level of the storage racks and being able to load or discharge items to both sides of an aisle.

Also shuttles with a stacked arrangement of two load handling platforms or an elevating platform are to be used in connection with the invention for handling several levels from a single rail.

The shuttle can be used in two arrangements, a so called "captive" or "roaming" arrangement. In the captive arrangement the shuttle stay in their respective level. In the roaming alternative the shuttle change levels as required.

It is thus possible in accordance with the invention to achieve a particularly high level of retrieval efficiency whilst fully maintaining the desired sequence of transporting or storage receptacles in any aisle. This is also achieved with considerably less technical work than in accordance with the prior art.

At least one lifting device is used, in order to transfer receptacles to the at least one storage-exit conveyor, i.e. the lift allows for level changes of receptacles coming from the storage-entry conveyor or destined to the storage-exit conveyor. Usually this will be a stationary lift, but also ASRS with lift functions (e.g. mini-load) could be envisioned. For example, automated shuttle-like storage and retrieval devices are known which service racks vertically by "climbing" vertical rails of the racks.

The at least one lift is optionally of the drive-through-type, meaning that receptacles may pass through the lift within the rack, as if it were a conveyor.

In a preferred embodiment a lift is installed in each rack of an aisle and each lift is either an inbound-lift connected to the storage-entry conveyor or an outbound-lift connected to the storage-exit conveyor or inbound and outbound-lift connected to both storage-entry and storage-exit conveyor.

Possible lifts include in particular vertical conveying means. It is favorable if each lift has one or more, in particular two, locations/positions for receptacles. It is also beneficial if each level of the storage racking has at least one buffer location for decoupling the single-level ASRS and the lift. This renders it possible to fully utilize the quicker single-level ASRS and to prevent empty-running of the lift.

It is also advantageous if each lift has a separately driven conveying means for each location. In particular, it is then advantageous if each lift has two locations which are each provided with a separately driven conveying means movable in different directions. Therefore, the transfer of two receptacles for each level can always be affected simultaneously in different directions or onto different outbound buffers, e.g. to the left and right. In addition, the reception of the receptacles onto the lift is preferably controlled so that two receptacles are discharged onto one level. This is possible on account of the high efficiency of the shuttles used, since the transfer locations (buffer location) to the lift are practically always occupied, so that for the control of the lift there is provided a selection option which allows the lift to be occupied accordingly by receptacles for different buffers of one level.

The automated storage and retrieval racking area may also include at least one fully or semiautomatic pack station for picking from donor receptacles into order receptacles for fulfilling orders, to which receptacles are fed by the at least one storage-exit conveyor and from which receptacles are dispatched by the at least one storage-entry conveyor. It is also possible to use several fully or semiautomatic pack stations and especially one for each aisle.

In the present application a fully automated order pack station is defined as a pack station according to the goods-to-person principle with fully automated receptacle handling, i.e. a fully automated supply and discharge and presentation of the receptacles. Empty order receptacles and receptacles with picking goods are automatically supplied to the station. Receptacles are placed in ergonomically optimal height on the pack station. Usually such a station will also incorporate means for directing, instructing and controlling as well as supervising the picker (e.g. pick-to-light etc.), who will still manually pick out of donor receptacles into order receptacles. As an option, the operator may be replaced with an automated picking device/machine to realize a fully automated picking process.

In contrast a semiautomatic pack station will not have the fully automated receptacle handling just described, but will involve manual processing of receptacles.

To fulfill orders a routing conveyor is connected to the at least one inbound storage-entry conveyor and/or the at least one storage-exit conveyor of the storage racking. This allows Further features and details of the invention are apparent from the description hereinafter of the drawings.

DESCRIPTION OF THE PREFERRED EMBODIMENTS

Figure 1:
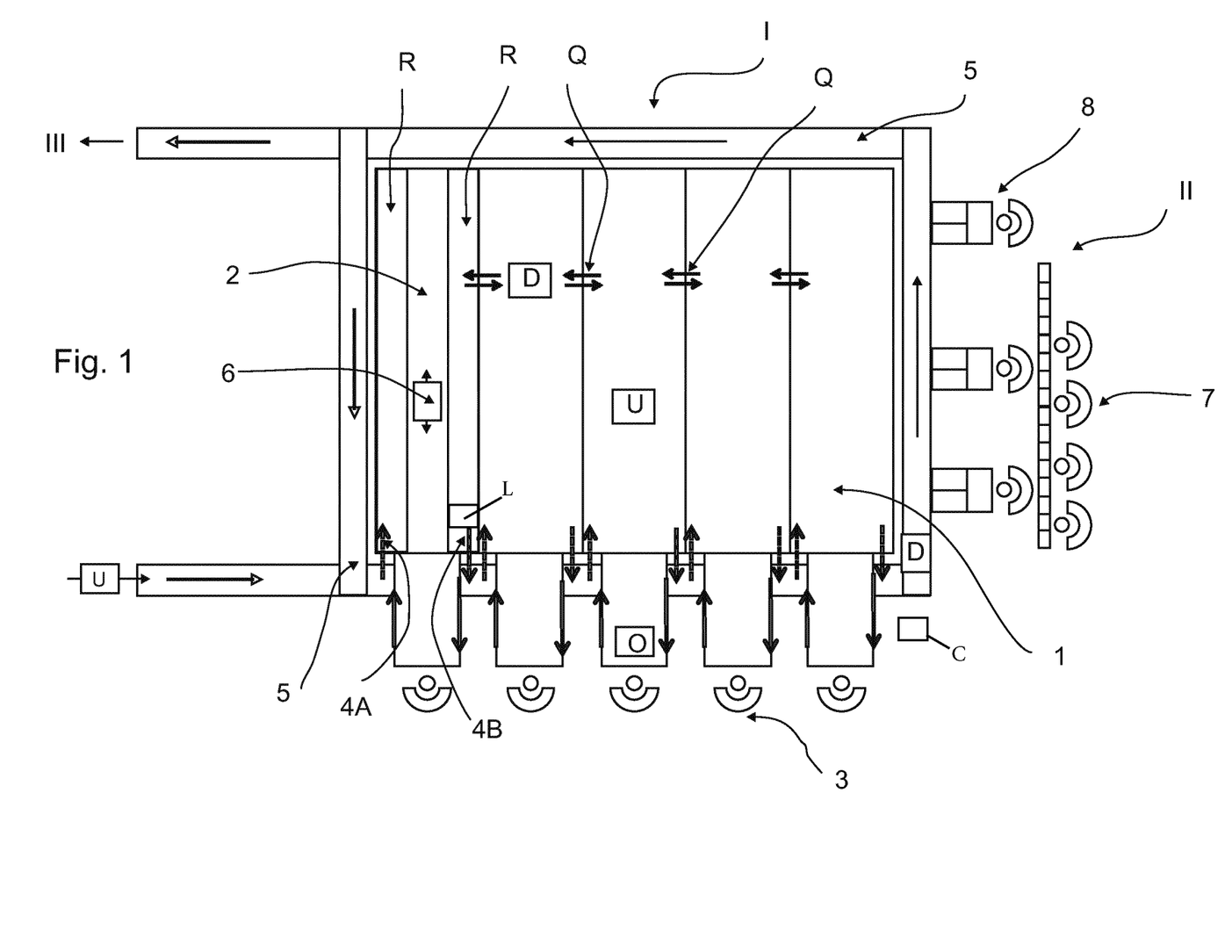
FIG. 1 shows a schematic plan view of a storage facility with an automated storage and picking area and a routed products order picking area connected downstream.

In FIG. 1 a schematic plan view of a storage facility with an automated storage and retrieval racking area I and a routed products order picking area II is shown. The automated storage and retrieval racking area I is arranged upstream from the routed products order picking area II and is connected to the routed products order picking area II by a routing conveyor 5, which eventually leads to a shipping area III but also loops back to the entry/exit of the automated storage and retrieval racking area I.

The automated storage and retrieval racking area I comprises a storage racking 1 comprising a plurality of multi-level storage racks R in which order and/or product units U are stored, wherein the storage racks R are disposed back-to-back in pairs and have an aisle 2 between pairs (only exemplified for one aisle). The aisles 2 are connected to semi or full-automated picking stations 3 through conveyor installations 4, which encompass at least one storage-entry conveyor 4A provided for feeding order and/or product units U into the storage racking 1, and at least one storage-exit conveyor 4B provided for retrieval of order and/or product units U from the storage racking 1. So, the semi/full automatic picking station 3 for picking from product units D (D for donor) into order units O (O for order) for fulfilling orders are fed by the at least one storage-exit conveyor 4B and order and/or product units are returned to the storage rack by the at least one storage-entry conveyor 4A. The automated storage and retrieval racking area I additionally comprises a lift L (FIG. 1) in the storage racks R.

The routing conveyor 5 is also connected to the at least one inbound storage-entry conveyor 4A and the at least one storage-exit conveyor 4B. In this manner, the routing conveyor 5 forms a loop connecting the picking stations 3, inbound storage-entry conveyors 4A and storage-exit conveyors 4B, the routed products picking area II and the shipping area III.

Each storage racking aisle 2 has one automatic storage and retrieval device in the form of a shuttle 6 provided in each level or each few levels for storage and retrieval of order and/or product units in the storage racks R. Order and/or product units U are exchanged directly between two adjoining storage racks R from a source storage rack to an adjacent destination storage rack via cross conveyance locations Q in the storage racks themselves, which can be one-way exchange locations Q or bidirectional, as disclosed in WO 2015/007514 A1.

The shuttle 6 itself displaces the order or product units U in the cross-conveyance locations Q actively with its load handling means, which are telescopic arms on both sides of a loading platform and are equipped with unit handling levers. There is no active drive means within the racks R themselves. The shuttle 6 of a source rack places the order or product units U into the cross-conveyance location Q in an adjacent destination rack, so that the shuttle operating in the according, neighboring aisle can handle the unit by normal deep operation. In other words, the sourcing shuttle operates deeper than for normal single or double deep storage, e.g. triple deep for exchange. Therefore, it is possible to transfer units U through the storage racking 1 without leaving the storage by transferring the units U via the cross-conveyance locations Q only.

As described, the semi/fully automatic picking stations 3 are sourced by the automated storage 1 for picking from product units D (D for donor) into order units O (O for order) for fulfilling orders. To do so the items needed to fulfil a certain order are all transferred via the cross-conveyance exchange described to a destination aisle for discharge to a specific semi/fully automatic picking station 3. This is possible via the cross-conveyance operations when order load is low, as not all picking stations 3 need to be manned/used.

As soon as order levels rise, further or all picking stations 3 will be manned/used. The use of cross conveyance operations to provide all picking stations 3 with the items necessary for order fulfillment can be achieved with high throughput for approx. ten aisles with directly connected picking stations. Higher numbers of aisles or picking stations 3 do not lead to higher throughput. To achieve or sustain such higher throughput, order fulfillment of orders requiring products from product units requiring many exchanges between adjoining storage racks from a source storage rack to an adjacent storage rack via cross conveyance locations Q in the storage racks themselves to reach a destination storage rack or aisle are reassigned by the system controller C (FIG. 1) to the routed products picking area I for parallel order fulfillment.

Therefore, orders are reassigned to the routed products area when the efficiency of the at least one automatic storage and retrieval device falls below a predetermined threshold for a predetermined feed rate of items to the at least one fully or semiautomatic picking station. In the present case such a feed rate is approx. 700 items per hour. Such orders usually require many items stored in many different aisles of the storage racking require items with many needed exchanges via cross conveyance locations are reassigned to the routed products area. To do so product units D requiring many exchanges via cross conveyance locations Q are discharged from the automated storage and retrieval racking area I to the routed products picking area II, which picking stations comprise manually operated put-walls 7 and single pick/ pack stations 8. This allows the system to sustain high throughput even when using more than ten picking stations/aisles.

The looped routing conveyor 5 therefore transports the product units D to the manually operated put-walls 7 and single pick/pack stations 8 according to order fulfilment requirements based upon warehouse management controls.

At the put-wall 7 operators use the put-wall cubby holes for buffering product units for later consolidation of donor units for orders containing many so-called ugly products, which are such products needing many aisle exchanges.

As described the routing conveyor 5 connects both the automated storage and retrieval racking area I and routed products picking area II to a shipping area III and also loops back to the automated storage and retrieval racking area I after leaving the routed products picking area II. Therefore, the fulfilled orders can be discharged for shipping to the shipping area III.

On the other hand, it is also possible to prepick orders (partially pick) and combine prepicked orders at a later point in time to finally fulfil the order. This can be performed at the put-walls 7 of the routed products order picking area II. Additionally, the put-walls 7 may be used to pick orders which include items that cannot be handled at the picking stations 3, e.g. due to size, weight etc. In addition, single orders (order consisting of only single product type) can be routed to the single pick/pack stations 8 for the sake of reducing workload at semi/fully automatic pick stations although this would not reduce amount of cross aisle transactions.

Figure 2:
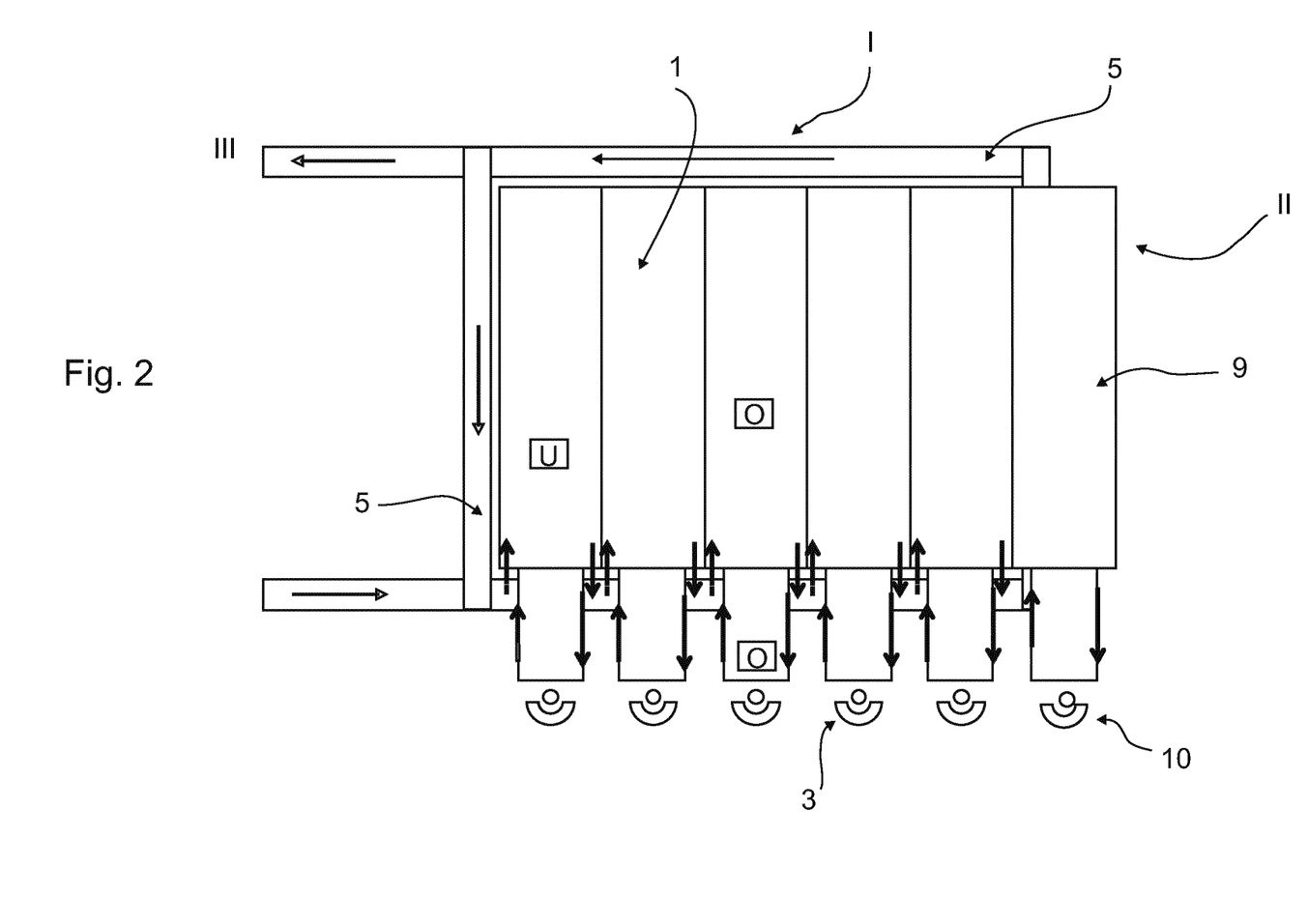
FIG. 2 shows a schematic plan view of an alternative storage facility with an automatic put wall for dedicated order consolidation.

Alternatively, the routed products order picking area II may include an automated put-wall 9 according to FIG. 2, which is integrated into the last aisle of the automated storage and retrieval racking area I and therefore forms an interface between both areas. Otherwise the automated storage and retrieval racking area I is similar to FIG. 1. The automated put-wall 9 is functionally performed by a dedicated aisle 10 of the automated storage and retrieval racking area I in which donor units are temporarily buffered for later discharge to semi/fully automatic picking station for the aisle or routed to specific picking station via the routing conveyor, so that inter aisle exchanges are minimized.

Figure 3:
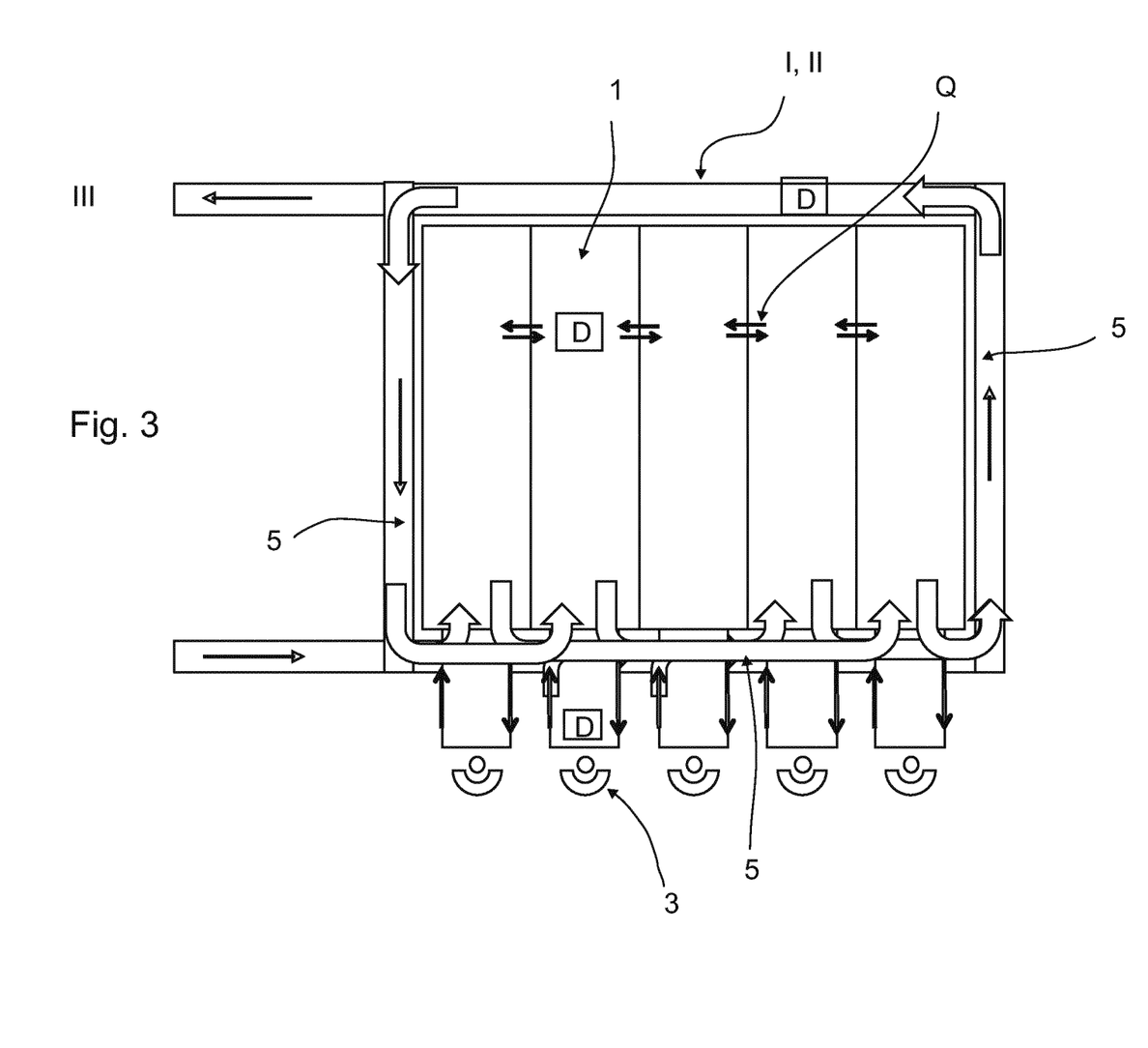
FIG. 3 shows a schematic plan view of an alternative storage facility with shared order consolidation.

In an alternative embodiment shown in FIG. 3, the routed products order picking area II is not spatially separated from the automated storage and retrieval racking area I, but only logically. Functionally both areas are interconnected via the routing conveyor 5 that loops automated storage and retrieval racking area I.

Therefore, donor units D needing many exchanges for order fulfilment in a certain aisle may be routed by the routing conveyor 5 "long-range" to the destination aisle for order fulfilment. Therefore, the donor units may be consolidated in any aisle without use of inter aisle exchanges if overall workload of the system is high or a predetermined efficiency threshold is not met, be based upon the feed rate of items to the at least one fully or semiautomatic picking station 3.

Accordingly, orders may be logically reassigned to the routed products order picking area when the efficiency of the at least one automatic storage and retrieval device falls below such predetermined threshold.

It has been found that when more than a certain number of picking stations (or aisle when these are directly connected) are present, the throughput decreases when all those picking stations are in use due to the amount of cross-conveyance operations necessary to provide the needed items to each picking station. Such a predetermined feed rate is 600-700 cases/items per hour per picking station.

The above embodiments may be combined with each other in many ways within the scope of the invention.

The invention claimed is:

1. A method of fulfilling orders by making products available in order units by picking from product units in a storage facility, wherein the storage facility comprises:
   a routing conveyor;
   a routed products order picking area, wherein the routed products order picking area comprises manual picking stations arranged along an extension of the routing conveyor;
   an automated storage and retrieval racking area arranged upstream from the routed products order picking area and connected to the routed products order picking area by the routing conveyor, wherein the automated storage and retrieval racking area comprises:
      a storage racking comprising a plurality of multilevel storage racks in which product units are stored, wherein the plurality of multilevel storage racks is disposed back-to-back in pairs and have a storage racking aisle between the pairs;
      at least one shuttle provided for each storage racking aisle, the at least one shuttle configured to store and retrieve product units from at least one of the plurality of multilevel storage racks and directly exchange product units between two adjoining multilevel storage racks, wherein directly exchanging products units between two adjoining multilevel storage racks comprises transferring product units from a source storage rack to an adjacent destination storage rack via cross conveyance locations in the storage racks themselves using only the at least one shuttle;
      at least one storage-entry conveyor for feeding product units into the storage racking, wherein the at least one storage-entry conveyor is connected to the routing conveyor;
      at least one storage-exit conveyor for retrieving product units from the storage racking, wherein the at least one storage-exit conveyor is connected to the routing conveyor; and
      at least one lift configured to transfer product units from a storage level of at least one of the plurality of multilevel storage racks to the at least one storage-exit conveyor; and
   at least one fully or semiautomatic picking station for picking from product units into order units for fulfilling orders, wherein product units are fed by the at least one storage-exit conveyor and dispatched by the at least one storage-entry conveyor,
   wherein the method comprises:
      reassigning by a system controller order fulfillment to the routed products order picking area for parallel order fulfillment by use of the routing conveyor for fulfillment of orders requiring products from product units requiring many exchanges to be performed by the least one shuttle between adjoining storage racks based on the number of exchanges to be performed;
      discharging the product units requiring many exchanges via cross conveyance locations for fulfilment of a specific order from the automated storage and retrieval racking area to the routed products picking area via the routing conveyor;
      supplying the product units requiring many exchanges via cross conveyance locations for fulfilment of a specific order to the routed products order picking area as donor product units;

supplying the routing conveyor with order units picked at the manual picking stations of the routed products order picking area; and discharging finished order units via the routing conveyor.

2. The method as claimed in claim 1, wherein product units expecting batch pick effect are discharged from the automated storage and retrieval racking area to the routed products order picking area.

3. The method as claimed in claim 1, wherein product units requiring many exchanges via cross conveyance locations are discharged from the automated storage and retrieval racking area to the fully or semiautomatic picking station belonging to the same racking area then products are dirty batch picked and routed to a put wall.

4. The method as claimed in claim 1, wherein the routed products order picking stations comprise put-walls.

5. The method as claimed in claim 1, wherein the routing conveyor loops back to the automated storage and retrieval racking area after leaving the routed products order picking area.

6. The method as claimed in claim 1, wherein the routed products order picking area comprises picking stations supplied and arranged along an outer aisle of the automated storage and retrieval racking area and supplying the routing conveyor with order units picked at the picking stations.

7. The method as claimed in claim 1, wherein the routed products order picking area is used for order consolidation of donors belonging to particular orders at the at least one fully or semiautomatic picking station.

8. The method as claimed in claim 1, wherein orders are reassigned to the routed products area when the efficiency of the at least one shuttle falls below a predetermined threshold.

9. The method as claimed in claim 8, wherein the predetermined efficiency threshold is based upon the feed rate of items to the at least one fully or semiautomatic picking station.

10. The method as claimed in claim 1, wherein orders requiring a plurality of items stored in a plurality of different aisles of the storage racking are reassigned to the routed products area.

11. The method as claimed in claim 1, wherein orders requiring items with many needed exchanges via cross conveyance locations are reassigned to the routed products order picking area by the routing conveyor, wherein the routed products order picking area is physically and/or logically separated from the automated storage and retrieval racking area.

12. The method as claimed in claim 2, wherein the routing conveyor loops back to the automated storage and retrieval racking area after leaving the routed products order picking area.

13. The method as claimed in claim 2, wherein the routed products order picking area comprises picking stations supplied and arranged along an outer aisle of the automated storage and retrieval racking area and supplying the routing conveyor with order units picked at the picking stations.

14. The method as claimed in claim 2, wherein the routed products order picking area is used for order consolidation of donors belonging to particular orders at the at least one fully or semiautomatic picking station.

15. The method as claimed in claim 2, wherein orders are reassigned to the routed products area when the efficiency of the at least one shuttle falls below a predetermined threshold.

16. The method as claimed in claim 15, wherein the predetermined efficiency threshold is based upon the feed rate of items to the at least one fully or semiautomatic picking station.

17. The method as claimed in claim 2, wherein orders requiring a plurality of items stored in a plurality of different aisles of the storage racking are reassigned to the routed products area.

18. The method as claimed in claim 2, wherein orders requiring items with many needed exchanges via cross conveyance locations are reassigned to the routed products order picking area by the routing conveyor, wherein the routed products order picking area is physically and/or logically separated from the automated storage and retrieval racking area.

19. The method as claimed in claim 1, wherein said reassigning by the system controller order fulfillment to the routed products order picking area for parallel order fulfillment based on the number of exchanges to be performed comprises reassigning based on a predetermined number of exchanges to be performed.

20. The method as claimed in claim 1, wherein said reassigning by the system controller order fulfillment to the routed products order picking area for parallel order fulfillment based on the number of exchanges to be performed comprises reassigning when the efficiency of the at least one shuttle falls below a predetermined threshold for a predetermined feed rate to the at least one fully or semiautomatic picking station.

21. The method as claimed in claim 1, wherein the storage racking is further configured to selectively store order units;
wherein the at least one shuttle is configured to store and retrieve order units from the storage racks, and wherein the at least one shuttle is configured to directly exchange order units between two adjoining storage racks from a source storage rack to an adjacent destination storage rack via cross conveyance locations in the storage racks themselves using only the least one shuttle;
wherein the least one storage-entry conveyor is configured to feed order units into the storage racking;
wherein the at least one storage-exit conveyor is further provided for retrieval of order units from the storage racking;
wherein the at least one lift is further configured to transfer order units from a storage level of at least one of the storage racks to the at least one storage-exit conveyor; and
wherein order units may be fed by the at least one storage-exit conveyor to the at least one fully or semiautomatic picking station for picking from product units into order units for fulfilling orders, and wherein order units may be dispatched from the at least one fully or semiautomatic picking station by the at least one storage-entry conveyor.

* * * * *